United States Patent
Wang et al.

(10) Patent No.: US 9,666,866 B2
(45) Date of Patent: May 30, 2017

(54) TRANSITION METAL HEXACYANOMETALLATE ELECTRODE WITH WATER-SOLUBLE BINDER

(71) Applicant: Sharp Laboratories of America, Inc., Camas, WA (US)

(72) Inventors: Long Wang, Vancouver, WA (US); Yuhao Lu, Vancouver, WA (US); Sean Vail, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 183 days.

(21) Appl. No.: 14/340,141

(22) Filed: Jul. 24, 2014

(65) Prior Publication Data

US 2014/0335409 A1    Nov. 13, 2014

Related U.S. Application Data

(63) Continuation-in-part of application No. 14/320,352, filed on Jun. 30, 2014, which is a continuation-in-part
(Continued)

(51) Int. Cl.
*H01M 4/62* (2006.01)
*H01M 4/58* (2010.01)
(Continued)

(52) U.S. Cl.
CPC ......... *H01M 4/622* (2013.01); *H01M 4/0404* (2013.01); *H01M 4/136* (2013.01);
(Continued)

(58) Field of Classification Search
CPC ........ H01M 4/622; H01M 4/58; H01M 4/625; H01M 4/136; H01M 4/1397; H01M 4/0404; H01M 10/052
See application file for complete search history.

(56) References Cited

U.S. PATENT DOCUMENTS

| | | | |
|---|---|---|---|
| 2012/0328936 A1* | 12/2012 | Wessells | H01M 10/054 429/188 |
| 2013/0236783 A1* | 9/2013 | Kose | H01M 4/13 429/211 |

OTHER PUBLICATIONS

V.D. Neff, Some performance characteristics of a Prussian Blue battery, Journal of Electrochemical Society, 132 (1985) 1382-1384.
(Continued)

*Primary Examiner* — Mark F Huff
*Assistant Examiner* — Monique Wills
(74) *Attorney, Agent, or Firm* — Law Office of Gerald Maliszewski; Gerald Maliszewski (57) ABSTRACT

A method is provided for fabricating a transition metal hexacyanometallate (TMHCM) electrode with a water-soluble binder. The method initially forms an electrode mix slurry comprising TMHCF and a water-soluble binder. The electrode mix slurry is applied to a current collector, and then dehydrated to form an electrode. The electrode mix slurry may additionally comprise a carbon additive such as carbon black, carbon fiber, carbon nanotubes, graphite, or graphene. The electrode is typically formed with TMHCM greater than 50%, by weight, as compared to a combined weight of the TMHCM, carbon additive, and binder. Also provided are a TMHCM electrode made with a water-soluble binder and a battery having a TMHCM cathode that is made with a water-soluble binder.

22 Claims, 4 Drawing Sheets

Related U.S. Application Data of application No. 14/271,498, filed on May 7, 2014, now Pat. No. 9,419,278, which is a continuation-in-part of application No. 14/230,882, filed on Mar. 31, 2014, which is a continuation-in-part of application No. 14/198,755, filed on Mar. 6, 2014, which is a continuation-in-part of application No. 14/198,702, filed on Mar. 6, 2014, now Pat. No. 9,583,751, which is a continuation-in-part of application No. 14/198,663, filed on Mar. 6, 2014, now Pat. No. 9,537,131, which is a continuation-in-part of application No. 14/193,782, filed on Feb. 28, 2014, which is a continuation-in-part of application No. 14/193,501, filed on Feb. 28, 2014, now Pat. No. 9,406,919, which is a continuation-in-part of application No. 14/174,171, filed on Feb. 6, 2014, now Pat. No. 9,455,431, which is a continuation-in-part of application No. 14/067,038, filed on Oct. 30, 2013, now Pat. No. 9,450,224, which is a continuation-in-part of application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, now Pat. No. 9,559,358, which is a continuation-in-part of application No. 13/432,993, filed on Mar. 28, 2012, now Pat. No. 9,269,953.

(51) Int. Cl.
   *H01M 4/136* (2010.01)
   *H01M 4/1397* (2010.01)
   *H01M 4/04* (2006.01)
   *H01M 10/052* (2010.01)

(52) U.S. Cl.
   CPC ........... *H01M 4/1397* (2013.01); *H01M 4/58* (2013.01); *H01M 4/625* (2013.01); *H01M 10/052* (2013.01); *Y02P 70/54* (2015.11)

(56) References Cited

OTHER PUBLICATIONS

N. Imanishi et al., Lithium intercalation behavior into iron cyanide complex as positive electrode of lithium secondary battery, Journal of Power Sources, 79 (1999) 215-219.

Y. Lu, L. Wang, J. Cheng, J.B. Goodenough, Prussian blue: a new framework for sodium batteries, Chemistry Communication, 48 (2012) 6544-6546.

L. Wang, Y. Lu, J. Liu, M. Xu, J. Cheng, D. zhang, J.B. Goodenough, A superior low-cost cathode for a Na-ion batthery, Angew. Chew. Int. Ed., 52(2013)1964-1967.

A. Eftekhari, Potassium secondary cell based on Prussian blue cathode, J.Power Sources, 126 (2004) 221-228.

C.D. Wessells, R.A. Huggins, Y, Cui, Copper hexacyanoferrate battery electrodes with long cycle life and high power, Nature Communication, 2(2011) 550.

C.D. Wessells et al., Nickel hexacyanoferrate nanoparticle electrodes for aqueous sodium and potassium ion batteries. Nano Letter, 11(2011) 5421-5425.

C.D. Wessells et al., The Effect of insertion species on nanostructured open framework hexacyanoferrate battery electrode, J. Electrochem. Soc., 159(2012) A98-A103.

T.Matsuda, M. Takachi, Y. Moritomo, A Sodium manganese ferrocyanide thin film for Na-ion batteries, Chemical Communications, DOI: 10.1039/C3CC3889E, Feb. 4, 2013.

S.-H. Yu et al., Iron hexacyanoferrate nanoparticles as cathode materials for lithium and sodium rechargeable batteries, ECS Electrochemistry Letters, 2(2013)A39-A41.

H.J. Bauser, D. Schwarzenbach, W. Petter, A. Ludi, the crystal structure of Prussian blue: Fe4[Fe(CN)6]3×H=O, Inorganic Chemistry, 16(1977) 2704-2710.

F. Herren et al., Neutron diffraction study of Prussian blue, Fe4[Fe(CN)6]3-xH2O. Location of water molecules and long-range magnetic order, Inorg. Chem. 1980, 19, 956-959.

D. Asakura et al., Bimetallic cyanide-bridged coordination polymers as lithium ion cathode materials : core@shell nanoparticles . . . , J. Am. Chem. Soc., 135(2013)2793-2799.

K.-S. Park et al., Enhanced charged-transfer kinetics by anion surface modification of LiFePO4, Chem. Mater. 24(2012)3212-3218.

X. Wu et al., Single-crystal FeFe(CN)6 nanoparticles: a high capacity and high rate cathode for Na-ion batteries, J. Mater. Chem. A., 1(2013)10130-10134.

Y. You et al., High-quality Prussian blue crystals as superior cathode materials for room-temperature sodium-ion . . . , Energy & Enivoronmental Science, Doi: 10.1039/C3EE44004D, Feb. 28, 2014.

* cited by examiner

TRANSITION METAL HEXACYANOMETALLATE ELECTRODE WITH WATER-SOLUBLE BINDER

RELATED APPLICATIONS

This application is a Continuation-in-Part of an application entitled, ELECTROLYTE ADDITIVES FOR TRANSITION METAL CYANOMETALLATE ELECTRODE STABILIZATION, invented by Yuhao Lu et al, Ser. No. 14/320,352, filed Jun. 30, 2014, Ser. No. 14/320,352 claims the benefit of a Provisional application entitled, HARD CARBON COMPOSITE FOR ALKALI METAL-ION BATTERIES, invented by Yuhao Lu et al, Ser. No. 62/009,069, filed Jun. 6, 2014, Ser. No. 14/320,352 claims the benefit of a Provisional application entitled, METAL CYANOMETALLATE SYNTHESIS METHOD, invented by Long Wang et al, Ser. No. 62/008,869, filed Jun. 6, 2014, Ser. No. 14/320,352 is a Continuation-in-Part of an application entitled, RECHARGEABLE METAL-ION BATTERY WITH NON-AQUEOUS HYBRID ION ELECTROLYTE, invented by Long Wang et al, Ser. No. 14/271,498, filed May 7, 2014, which is a Continuation-in-Part of an application entitled, REACTIVE SEPARATOR FOR A METAL-ION BATTERY, invented by Long Wang et al, Ser. No. 14/230,882, filed Mar. 31, 2014, which is a Continuation-in-Part of an application entitled, NASICON-POLYMER ELECTROLYTE STRUCTURE, invented by Long Wang et al, Ser. No. 14/198,755, filed Mar. 6, 2014, which is a Continuation-in-Part of an application entitled, BATTERY WITH AN ANODE PRELOADED WITH CONSUMABLE METALS, invented by Yuhao Lu et al, Ser. No. 14/198,702, filed Mar. 6, 2014, which is a Continuation-in-Part of an application entitled, BATTERY ANODE WITH PRELOADED METALS, invented by Long Wang et al, Ser. No. 14/198,663, filed Mar. 6, 2014, which is a Continuation-in-Part of an application entitled, METAL BATTERY ELECTRODE WITH PYROLYZED COATING, invented by Yuhao Lu et al, Ser. No. 14/193,782, filed Feb. 28, 2014, which is a Continuation-in-Part of an application entitled, METAL HEXACYANOMETALLATE ELECTRODE WITH SHIELD STRUCTURE, invented by Yuhao Lu et al, Ser. No. 14/193,501, filed Feb. 28, 2014, which is a Continuation-in-Part of an application entitled, CYANOMETALLATE CATHODE BATTERY AND METHOD FOR FABRICATION, invented by Yuhao Lu et al, Ser. No. 14/174,171, filed Feb. 6, 2014, This application is a Continuation-in-Part of an application entitled, SODIUM IRON(II)-HEXACYANOFERRATE(II) BATTERY ELECTRODE AND SYNTHESIS METHOD, invented by Yuhao Lu et al, Ser. No. 14/067,038, filed Oct. 30, 2013, which is a Continuation-in-Part of an application entitled, TRANSITION METAL HEXACYANOMETALLATE-CONDUCTIVE POLYMER COMPOSITE, invented by Sean Vail et al., Ser. No. 14/059,599, filed Oct. 22, 2013, which is a Continuation-in-Part of an application entitled, METAL-DOPED TRANSITION METAL HEXACYANOFERRATE (TMHCF) BATTERY ELECTRODE, invented by Yuhao Lu et al., Ser. No. 13/907,892, filed Jun. 1, 2013, which is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013, which is a Continuation-in-Part of an application entitled, PROTECTED TRANSITION METAL HENACYANOFERRATE BATTERY ELECTRODE, invented by Yuhao Lu et al., Ser. No. 13/872,673, filed Apr. 29, 2013, which is a Continuation-in-Part of an application entitled, TRANSITION METAL HENACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013, which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012, Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012, which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012, which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012, All these applications are incorporated herein by reference.

This invention was made with Government support under DE-AR0000297 awarded by DOE. The Government has certain rights in this invention.

BACKGROUND OF THE INVENTION

1. Field of the Invention

This invention generally relates to electrochemical batteries and, more particularly, to a water-soluble binder for use with a transition. metal hexacyanometallate electrode.

2. Description of the Related Art

Transition metal cyanometallates (TMCMs) with large interstitial spaces have been investigated as the cathode material for rechargeable lithium-ion batteries [1, 2], sodium-ion batteries [3, 4], and potassium-ion batteries [5]. With an aqueous electrolyte containing the proper alkali-ions or ammonium-ions, copper and nickel hexacyanoferrates ((Cu,Ni)-HCFs) exhibited a very good cycling life with 83% capacity retained after 40,000 cycles at a charge/discharge current of 17 C (1 C=150 milliamps per gram) [6-8]. However, the materials within the aqueous electrolyte demonstrated low capacities and energy densities because: (1) just one sodium-ion can be inserted/extracted into/from per Cu-HCF or Ni-HCF formula, and (2) these transition metal cyanoferrate (TM-HCF) electrodes must be operated below 1.23 V due to the water electrochemical window. The electrochemical window of a substance is the voltage range between which the substance is neither oxidized nor reduced. This range is important for the efficiency of an electrode, and once out of this range, water becomes electrolyzed, spoiling the electrical energy intended for another electrochemical reaction.

To correct these shortcomings, manganese hexacyanoferrate (Mn-HCF) and iron hexacyanoferrate (Fe-HCF) were used as cathode materials in non-aqueous electrolyte [9, 10]. Assembled with a sodium-metal anode, Mn-HCF and Fe-HCF electrodes cycled between 2.0V and 4.2 V and delivered capacities of about 150 mAh/g.

Unlike conventional lithium-ion battery cathode materials, TMHCF can be easily prepared via precipitation in water, and does not require further high-temperature treatment. Parent applications Ser. Nos. 62/008,869 and 14/067,038, among others, describe exemplary precipitation synthesis, and are incorporated herein by reference. For example, $Na_2MnFe(CN)_6$ can be easily made by mixing two water solutions containing $Na_4Fe(CN)_6$ and $MnCl_2$, which are subsequently filtered and dried at 100° C. Such an aqueous solution-based synthesis route provides an as-prepared TMHCF chemical having good stability and dispersion capability in water. Thus, TMHCM has a significantly lower synthesis cost as compared with the cathode materials used for lithium-ion batteries (LIBs). The low material cost of TMHCM makes it a very promising cathode material for stationary energy storage batteries, but the fabrication costs need to be cut even further to make it a truly viable battery option. Polyvinylidene fluoride (PVDF) is used as a standard binder for cathode electrode in LIBs because of its good adhesion and electrochemical stability. However, harmful organic solvents, like N-Methyl-2-pyrrolidone (NMP), are used to dissolve PVDF during the electrode coating process. A solvent recycling system is therefore required for cost and environment concerns. Thus, a high fabrication cost is associated with the conventional PVDF binder.

In contrast, a water-soluble binder is relatively inexpensive, process preferable, and environment friendly, all of which makes it a desirable binder for use in energy storage batteries. Although the substitution of PVDF with a water-soluble binder like carboxymethylcellulose (CMC) in LIBs has been investigated, challenges remain because the electrochemical performance of lithium transition metal oxides are compromised from dissolution or poor dispersion capability when aqueous binders are used. The electrode materials for lithium-ion batteries are prepared using high temperature calcinations, and problems typically occur when they are put into a water solution during electrode fabrication. For example, an ion-exchange reaction occurs between proton and lithium ions when $LiMn_2O_4$ is put into water. In other examples, the dissolution of active materials is observed when a $LiNi_{1/3}Co_{1/3}Mn_{1/3}O2$ electrode is processed in an aqueous solution, and poor adhesion between $LiFePO_4$ electrode and the current collector also hinders using water-soluble binders for battery fabrication.

It would be advantageous if a high quality electrode could be fabricated, with transition metal hexacyanometallate (TMHCM) as an active material and an aqueous binder, for use in sodium-ion batteries (SIBs) or other rechargeable metal-ion batteries.

[1] V. D. Neff, Some performance characteristics of a Prussian Blue battery, Journal of Electrochemical Society, 132 (1985) 1382-1384.

[2] N. Imanishi, T. Morikawa, J. Kondo, Y. Takeda, O. Yamamoto, N. Kinugasa, T. Yamagishi, Lithium intercalation behavior into iron cyanide complex as positive electrode of lithium secondary battery, Journal of Power Sources, 79 (1999) 215-219.

[3] Y. Lu, L. Wang, J. Cheng, J. B. Goodenough, Prussian blue: a new framework for sodium batteries, Chemistry Communication, 48(2012)6544-6546.

[4] L. Wang, Y. Lu, J. Liu, M. Xu, J. Cheng, D. Zhang, J. B. Goodenough, A superior low-cost cathode for a Na-ion battery, Angew, Chem. Int. Ed., 52(2013)1964-1967.

[5] A. Eftekhari, Potassium secondary cell based on Prussian blue cathode, J. Power Sources, 126 (2004) 221-228.

[6] C. D. Wessels, R. A. Huggins, Y. Cui, Copper hexacyanoferrate battery electrodes with long cycle life and high power, Nature Communication, 2(2011) 550.

[7] C. D. Wessels, S. V. Peddada, R. A. Huggins, Y. Cui, Nickel hexacyanoferrate nanoparticle electrodes for aqueous sodium and potassium ion batteries, Nano Letter, 11(2011) 5421-5425.

[8] C. D. Wessels, S. V. Peddada, M. T. McDowell, R. A. Huggins, Y. Cui, The effect of insertion species on nanostructured open framework hexacyanoferrate battery electrode, J. Electrochem. Soc., 159(2012) A98-A103.

[9] T. Matsuda, M. Takachi, Y. Moritomo, A sodium manganese ferrocyanide thin film for Na-ion batteries, Chemical Communications, DOI: 10.1039/C3CC38839E.

[10] S. -H. Yu, M. Shokouhimehr, T. Hyeon, Y. -E. Sung, Iron hexacyanoferrate nanoparticles as cathode materials for lithium and sodium rechargeable batteries, ECS Electrochemistry Letters, 2(2013)A39-A41.

SUMMARY OF THE INVENTION

Disclosed herein is an electrode comprising transition metal hexacyanometallates (TMHCMs) as an active material and a water-soluble binder. The electrode can serve either as a cathode or an anode in a rechargeable using metal-ions such as lithium ($Li^+$), ammonium ($NH_4^+$), sodium ($Na^+$), potassium ($K^+$), magnesium ($Mg^{2+}$), aluminum ($Al^{3+}$), cesium ($Cs^+$), rubidium ($Rb^+$), zinc ($Zn^{2+}$), barium ($Ba^{2+}$), strontium ($Sr^{2+}$), or calcium ($Ca^{2+}$) battery. The water-soluble binder may be poly(acrylonitrile-co-acrylamide)polymer, carboxymethylcellulose (CMC), poly vinyl alcohol, polyvinylpyrrolidone, poly acrylic acid, polymethacrylic acid, polyethylene oxide, polyacrylamide, poly-N-isopropylacrylamide, Poly-N,N-dimethylacrylamide, polyethyleneimine, polyoxyethylene, polyvinylsulfonic acid, poly(2-methoxyethoxyethoxyethylene), styrene butadiene rubber (SBR), butadiene-acrylonitrile, rubber (NBR), hydrogenated NBR (HNBR), epichlorhydrin rubber (CHR), acrylate rubber (ACM), poly(allylamine), xanthan gum, guar gum, chitosan, polyvinyl acetate, gelatin, casein. The water-soluble binder may be natural cellulose, physically and/or chemically modified cellulose, natural polysaccharides, chemically and/or physically modified polysaccharides, hydroxy methyl cellulose or methyl ethyl hydroxy cellulose. The water-soluble binder may also be a poly (carboxylic acid), some examples of which include polylactic acid (PLA), polyacrylic acid, polysuccinic acid, poly maleic acid and anhydride, poly furoic (pyromucic acid), poly fumaric acid, poly sorbic acid, poly linoleic acid, poly linolenic acid, poly glutamic acid, poly methacrylic acid, poly licanic acid, poly glycolic acid, poly aspartic acid, poly amic acid, poly formic acid, poly acetic acid, poly propoionic acid, poly butyric acid, poly sebacic acid, and copolymers thereof.

Also provided is a method of fabricating such an electrode with an aqueous solution. A slurry comprising TMHCM and a binder selected from the aforementioned examples is formed and coated onto a metal (e.g., aluminum, copper, nickel, etc.) or carbon current collector. The binder can be either completely or partially dissolved into water.

Accordingly, the method for fabricating the TMHCM electrode with a water-soluble binder initially forms an electrode mix slurry comprising TMHCF and a water-soluble binder. The electrode mix slurry is applied to a current collector, and then dehydrated to form an electrode. The electrode mix slurry may additionally comprise a carbon additive such as carbon black, carbon fiber, carbon nanotubes, graphite, or graphene.

The electrode is typically formed with TMHCM greater than 50%, by weight, as compared to a combined weight of the TMHCM, carbon additive, and binder.

Additional details of the above-described method, a TMHCM electrode made with a water-soluble binder, and battery made using such an electrode as the cathode are provided below.

DETAILED DESCRIPTION

Figure 1:
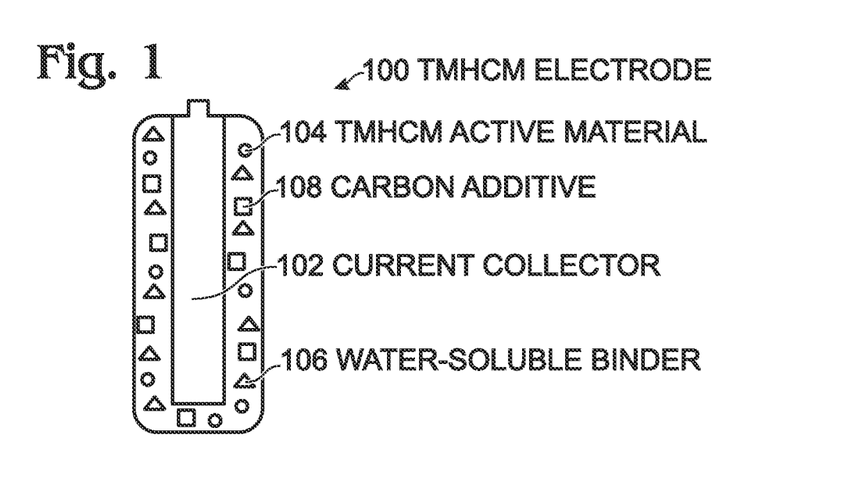
FIG. 1 is a partial cross-section view of a transition metal hexacyanometallate (TMHCM) electrode with water-soluble binder.

FIG. 1 is a partial cross-section view of a transition metal. hexacyanometallate (TMHCM) electrode with water-soluble binder. The electrode 100 comprises a current collector 102, which may be a metal such as aluminum, copper, or nickel, or conductive carbon material. A TMHCM active material, represented with reference designator 104, overlies the current collector 102. A water-soluble material, represented with reference designator 106, binds the TMHCM material 104 to the current collector 102. Typically, as shown, the electrode 100 further comprises a carbon additive represented by reference designator 108. Some examples of carbon additives 108 include carbon black (soft carbon carbon fiber, carbon nanotubes, graphite, and graphene.

Some examples of the water-soluble material 106 include poly(acrylonitrile-co-acrylamide)polymer, carboxymethyl-cellulose (CMC), poly vinyl alcohol, polyvinylpyrrolidone, poly acrylic acid, polymethacrylic acid, polyethylene oxide, polyacrylamide, poly-N-isopropylacrylamide, Poly-N,N-dimethylacrylamide, polyethyleneimine, polyoxyethylene, polyvinylsulfonic acid, poly(2-methoxyethoxyethoxyethylene), styrene butadiene rubber (SBR), butadiene-acrylonitrile, rubber (BR), hydrogenated NBR (HNBR), epichlorhydrin rubber (CHR), acrylate rubber (ACM), poly (allylamine), xanthan gum, guar gum, chitosan, polyvinyl acetate, gelatin, casein, cellulose, and poly(carboxylic acid).

Some explicit examples of cellulose include natural cellulose, physically modified cellulose, chemically modified cellulose, natural polysaccharides, chemically modified polysaccharides, physically modified polysaccharides, hydroxy methyl cellulose, and methyl ethyl hydroxy cellulose. Some explicit examples of poly(carboxylic acid) include polylactic acid (PLA), polyacrylic acid, polysuccinic acid, poly maleic acid and anhydride, poly furoic acid (pyromucic acid), poly fumaric acid, poly sorbic acid, poly linoleic acid, poly linolenic acid, poly glutamic acid, poly methacrylic acid, poly licanic acid, poly glycolic acid, poly aspartic acid, poly amic acid, poly formic acid, poly acetic acid, poly propoionic acid, poly butyric acid, poly sebacic acid, and copolymers thereof.

Lithium is a common choice as an active material in conventional batteries. Lithium compounds are conventionally prepared with non-aqueous binders such as PVDF. As noted above, an ion-exchange occurs when these conventional lithium compounds react with water, causing dissolution and adhesion problems. Advantageously, since TMHCM materials are prepared in water, the use of a water-soluble binder does not create the compatibility issues associated with the use of lithium compounds. TMHCM is stable and dispersed easily in water. Since TMHCM materials share many of the same characteristics as conventional lithium compounds, the prevalent thinking in the industry has been to make TMHCM electrodes using many of the same processes as lithium batteries, including the use of non-aqueous binders. Thus, although the use of water-soluble binders is not unheard of, it is new to the application of TMHCM electrodes.

The TMHCM active material 104 of electrode 100 is typically greater than 50%, by weight, as compared to a combined weight of the TMHCM active material 104, carbon additive 108, and binder 106. The TMHCM active material 104 is expressed by the formula $A_N M1_P M2_Q (CN)_R \cdot_F H_2O$;

where "A" is typically an alkali or alkaline earth metal;
where M1 and M2 are independently selected (may be the same or different metals) from the group of transition metals;
where N is in the range of 0 to 2;
where P is less than or equal to 2;
where F is in the range of 0 to 20;
where Q is less than or equal to 2; and,
where R is less than or equal to 6.

Some explicit examples of the metals that comprise the "A" element include lithium (Li), sodium (Na), potassium (K), rubidium (Rb), cesium (Cs), calcium (Ca), strontium (Sr), barium (Ba), silver (Ag), aluminum (Al), magnesium (Mg), and combinations thereof, Some explicit examples of M1 and M2 metals include titanium (Ti), vanadium (V), chromium (Cr), manganese (Mn), iron (Fe), cobalt (Co), nickel (Ni), copper (Cu), zinc (Zn), niobium (Nb), ruthenium (Ru), tin (Sn), indium (In), cadmium (Cd), Ca, magnesium (Mg), strontium (Sr), and barium (Ba).

Some examples of transitions metals from which M1 and M2 are each independently selected include titanium (Ti), vanadium (V), chromium (Cr), manganese (Mn), iron (Fe), cobalt (Co), nickel (Ni), copper (Cu), zinc (Zn), niobium (Nb), ruthenium (Ru), tin (Sn), indium (In), cadmium (Cd), Ca, Mg, strontium (Sr), and barium (Ba).

Figure 2:
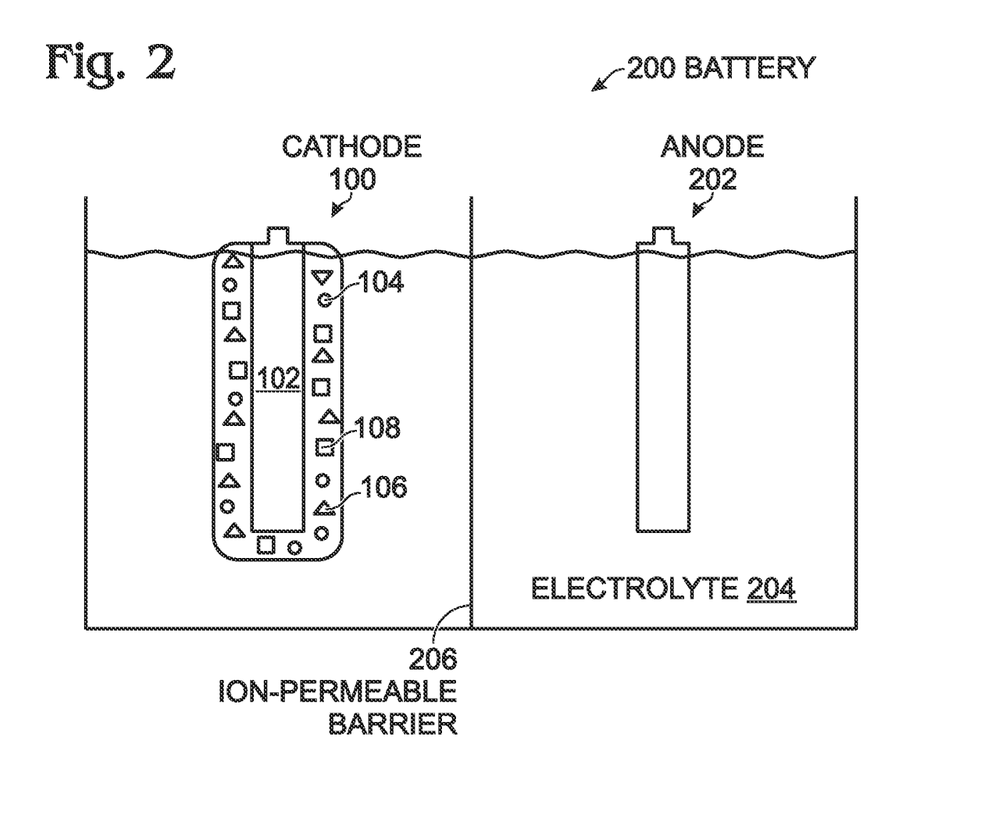
FIG. 2 is a partial cross-sectional view of a battery having a TMHCM cathode with water-soluble binder.

FIG. 2 is a partial cross-sectional view of a battery having a TMHCM cathode with water-soluble binder. The battery 200 comprises a cathode 100 comprising TMHCM 104 and a water-soluble binder 106. The cathode 100, which is one example of the type of electrode described in FIG. 1, is typically formed on a current collector 102. The battery 200 also comprises an anode 202 and an electrolyte 204. As shown, the battery may further comprise an ion-permeable barrier 206. It is also typical that the cathode further comprises a carbon additive 108, such as carbon black, carbon fiber, carbon nanotubes, graphite, or graphene.

As noted above in the description of FIG. 1, the TMHCM 104 can be expressed by the formula $A_N M1_P M2_Q (CN)_R \cdot_F H_2O$;

where "A" is selected from a first group of metals that include alkali and alkaline earth metals;

where M1 and M2 are independently selected from a second group of transition metals;

where N is in the range of 0 to 2;

where P is less than or equal to 2;

where F is in the range of 0 to 20;

where Q is less than or equal to 2; and, where R is less than or equal to 6.

The anode 202 may be made from carbonaceous materials, alkali metals, alkaline earth metals, alloys including tin, alloys including lead, alloys including silicon, alloys including phosphorous, alloys including germanium, titanates including alkali metals, titanates including alkaline earth metals, and combinations thereof.

The materials that may be used as the water-soluble binder are listed above in the description of FIG. 1, and are not repeated here in the interest of brevity.

Some potential liquid electrolytes 204 include dimethyl carbonate and diethyl carbonate, ethylene carbonate, propylene carbonate, dimethoxy ethane, and ethylmethyl carbonate. Some potential polymer (gel) electrolytes 204 include poly(ethylene oxide) (PEO), poly(acrylonitrile) (PAN), poly(methyl metacrylate) (PMMA), polyvinyl chloride) (PVC), poly(vinylidene fluoride) (PVdF), and polyethylene (PE).

Electrodes, especially cathodes, in lithium-ion batteries (LIBs) use a conventional polyvinylidene fluoride (PVDF) as a binder that results in high material and fabrication cost. Moreover, the use of N-Methyl-2-pyrrolidone (NMP) as solvent during the electrode coating process has a strong impact on the environment. However, due the stability and dispersing capability of TMHCM in an aqueous solution, it is possible to fabricate such an electrode in a cheap, fast, and environment friendly process. Electrodes, fabricated using a doctor blade casting method with a slurry of PVDF binder and NMP solvent, were employed as the baseline for comparison. Excellent rate capability and good mechanical properties were obtained from electrodes made from $Na_2MnFe(CN)_6$ and water-soluble binders (CMC and SBR). The electrodes were coated onto an aluminum foil with an aqueous slurry. The electrode made with the water solution did not negatively impact battery performance when used as a cathode in a sodium battery. Electrodes with other TMHCMs and water-soluble binders can be prepared with similar manner and used in other rechargeable metal-ion batteries.

Figure 3:
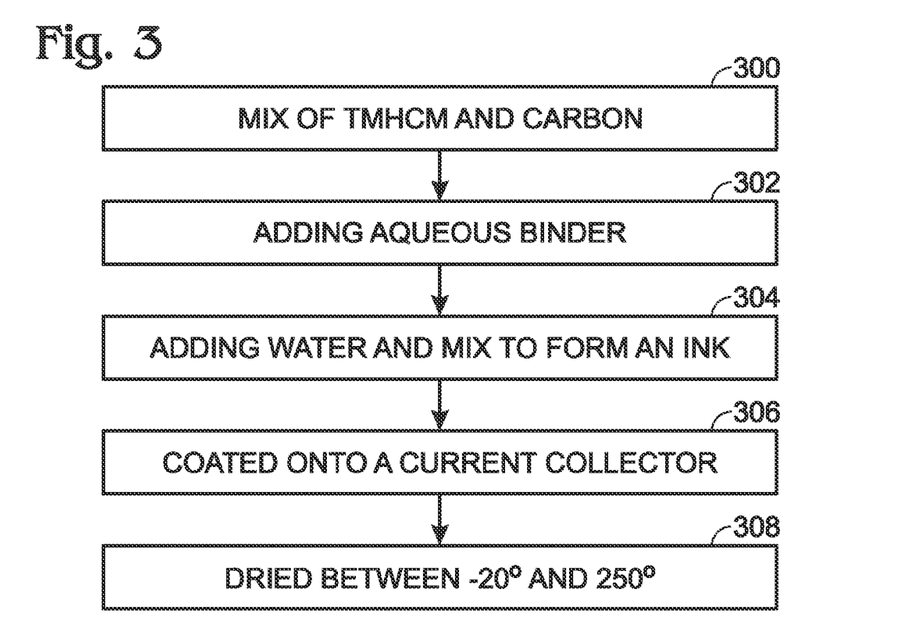
FIG. 3 is a flowchart describing one example of fabricating a TMHCM electrode with water-soluble binder.

FIG. 3 is a flowchart describing one example of fabricating a TMHCM electrode with water-soluble binder. In Step 300 $Na_2MnFe(CN)_6$ and carbon black are mixed thoroughly, and in Step 302 a suspension of CMC and SBR is added. In Step 304 water is then added into the mixture to form a stable ink that is used for blade-casting in Step 306. After coating the slurry onto an aluminum foil, Step 308 dries at the desired temperature. The result is an electrode of $Na_2MnFe(CN)_6$, carbon black, and aqueous binder formed with a uniform thickness. It should be noted the sequence of Steps 300, 302, and 304 may be changed as needed.

Figure 4A:
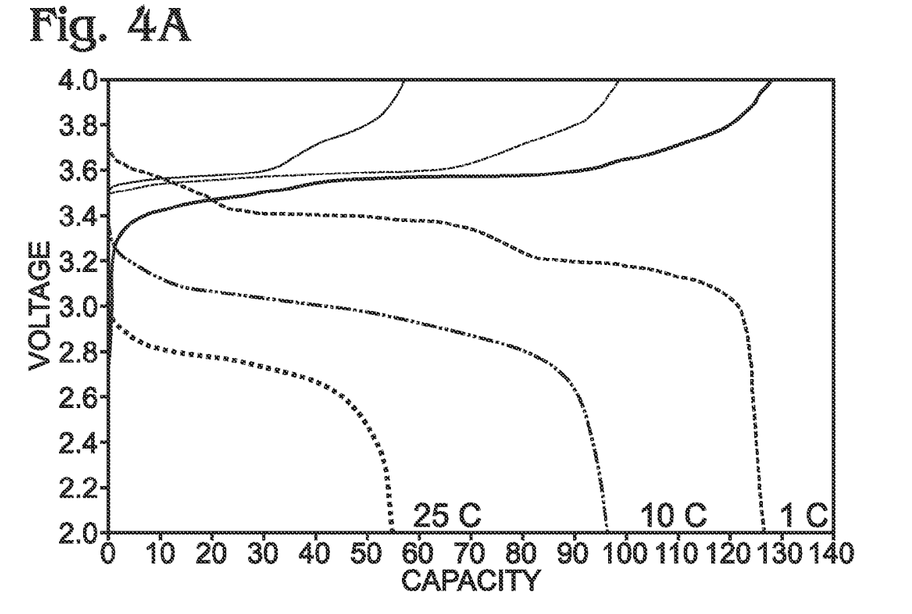
FIGS. 4A and 4B are graphs of the rate capability of Prussian White (PW) electrodes with ca. 70 μm and 100 micron (μm) thicknesses, respectively.
Figure 4B:
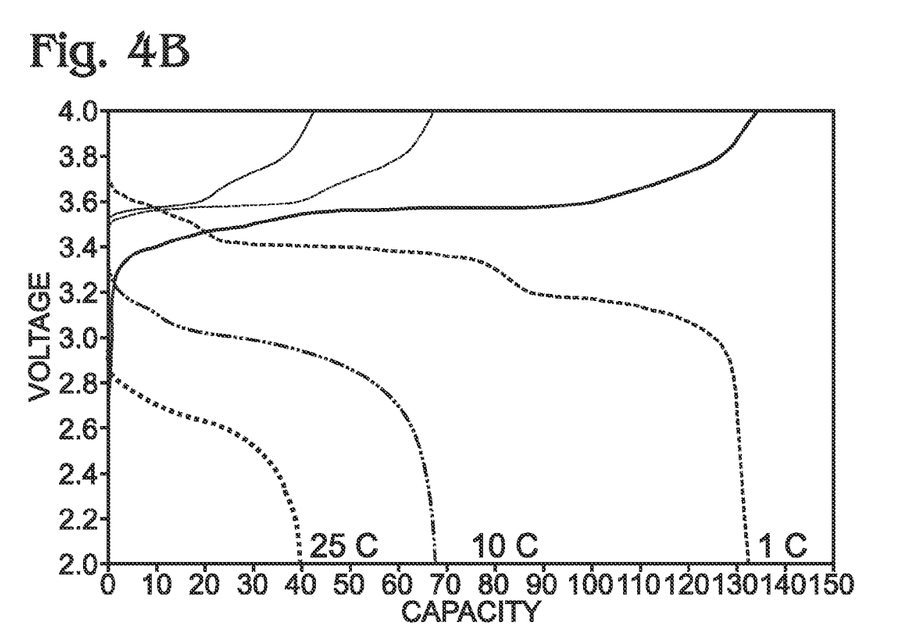

FIGS. 4A and 4B are graphs of the rate capability of Prussian White (PW) electrodes with ca. 70 μm and 100 micron (μm) thicknesses, respectively. The two electrodes consist of 80% $Na_2MnFe(CN)_6$, 10% carbon black, and 10% PVDF, fabricated by using NMP as a process solvent. The electrodes were evaluated with a half-cell in which sodium metal was used as a counter electrode. Discharge capacities under varied current densities were recorded as benchmarks for comparison to electrodes with water-based binders. In general, a discharge capacity of 130 mAh/g can be obtained at 1 C (1 C=150 milliamps per gram (mA/g)) regardless of the electrode thickness.

Figure 5A:
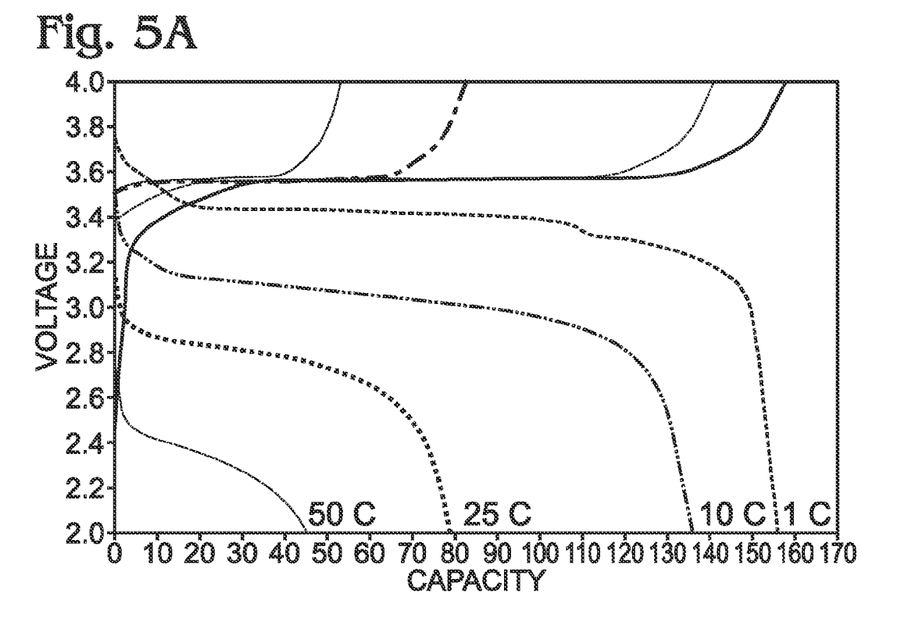
FIGS. 5A and 5B are graphs depicting the rate capability of PW electrodes fabricated with CMC-SBR based binders, at thicknesses of 40 and 70 μm, respectively.
Figure 5B:
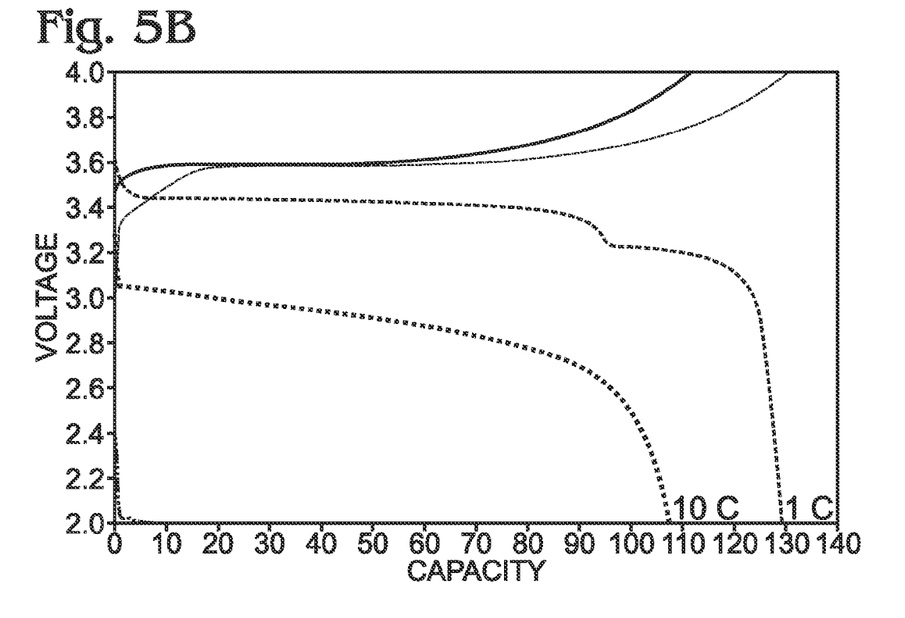

FIGS. 5A and 5B are graphs depicting the rate capability of PW electrodes fabricated with CMC-SBR based binders, at thicknesses of 40 and 70 μm, respectively. The electrode composition was PW:C:CMC:SBR=75:15:5:5 (FIG. 5A) and PW:C:CMC:SBR=88:7:2.5:2.5 (FIG. 5B). The electrode of FIG. 5A comprises 15% carbon and has a thickness of 40 microns. The electrode of FIG. 5B comprises 7.5% carbon and has a thickness of 70 microns. The electrodes prepared with the CMC/SBR (1/1 wt/wt) binder were evaluated in an identical manner using the two different carbon contents. The electrode with the high carbon content (15%; FIG. 5A) had an excellent rate capability, with a discharge capacity of 130 mAh/g when the battery was discharged at 10 C. It is notable that with a decreased carbon amount (7%; FIG. 5B) and similar thickness as that of the PVDF-based electrode, a high reversible capacity of 140 mAh/g was obtained at 1 C. Thus, no adversely impact was observed by using CMC/SBR binders, and a better rate capability was achieved.

Figure 6:
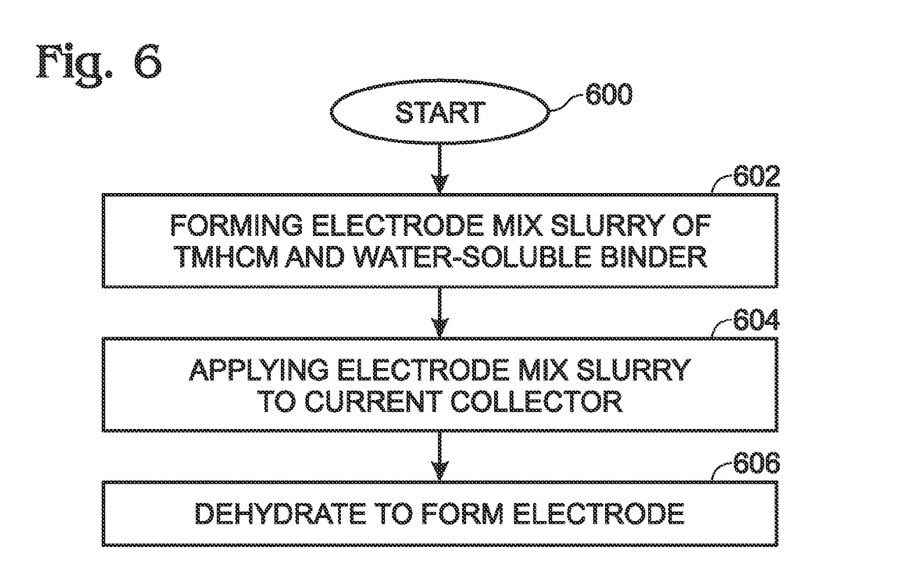
FIG. 6 is a flowchart illustrating a method of fabricating a TMHCM electrode with a water-soluble binder.

FIG. 6 is a flowchart illustrating a method of fabricating a TMHCM electrode with a water-soluble binder. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 600.

Step 602 forms an electrode mix slurry comprising TMHCF and a water-soluble binder. Step 604 applies the electrode mix slurry to a current collector. Step 606 dehydrates the electrode mix to form an electrode. In one aspect, forming the electrode mix slurry in Step 602 includes the electrode mix slurry additionally comprising a carbon additive such as carbon black, carbon fiber, carbon nanotubes, graphite, or graphene. Typically, the electrode is formed with TMHCM greater than 50%, by weight, as compared to a combined. weight of the TMHCM, carbon additive, and binder, after all the water has been removed in Step 606.

The water-soluble material may be poly(acrylonitrile-co-acrylamide)polymer, carboxymethylcellulose (CMC), poly vinyl alcohol, polyvinylpyrrolidone, poly acrylic acid, polymethacrylic acid, polyethylene oxide, polyacrylamide, poly-N-isopropylacrylamide, Poly-N,N-dimethylacrylamide, polyethyleneimine, polyoxyethylene, polyvinylsulfonic acid, poly(2methoxyethoxyethoxyethylene), styrene butadiene rubber (SBR), butadiene-acrylonitrile, rubber (NBR), hydrogenated NBR (HNBR), epichlorhydrin rubber (CHR), acrylate rubber (ACM), poly(allylamine), xanthan gum, guar gum, chitosan, polyvinyl acetate, gelatin, casein, cellulose, or poly(carboxylic acid).

Some examples of cellulose include natural cellulose, physically modified cellulose, chemically modified cellulose, natural polysaccharides, chemically modified polysaccharides, physically modified polysaccharides, hydroxy methyl cellulose, and methyl ethyl hydroxy cellulose. Some examples of poly(carboxylic acid) include polylactic acid (PIA), polyacrylic acid, polysuccinic acid, poly maleic acid and anhydride, poly furoic (pyromucic acid), poly fumaric acid, poly sorbic acid, poly linoleic acid, poly linolenic acid, poly glutamic acid, poly methacrylic acid, poly licanic acid, poly glycolic acid, poly aspartic acid, poly amic acid, poly formic acid, poly acetic acid, poly propoionic acid, poly butyric acid, poly sebacic acid, and copolymers thereof.

A TMHCM electrode made with a water-soluble binder has been presented. Examples of particular materials and process steps have been provided to illustrate the invention. However, the invention is not limited to merely these examples. Other variations and embodiments of the invention will occur to those skilled in the art.

We claim:

1. A transition metal hexacyanometallate (TMHCM) electrode with water-soluble binder, the electrode comprising:
   a current collector;
   a TMHCM active material overlying the current collector;
   exclusively water-soluble materials binding the TMHCM material to the current collector.

2. The electrode of claim 1 wherein the water-soluble material is selected from the group consisting of poly (acrylonitrile-co-acrylamide)polymer, carboxymethylcellulose (CMC), poly vinyl alcohol, polyvinylpyrrolidone, poly acrylic acid, polymethacrylic acid, polyethylene oxide, polyacrylamide, poly-N-isopropylacrylamide, poly-N,N-dimethylacrylamide, polyethyleneimine, polyoxyethylene, polyvinylsulfonic acid, poly(2-methoxyethoxyethoxyethylene), styrene butadiene rubber (SBR), butadiene-acrylonitrile rubber (NBR), hydrogenated NBR (HNBR), epichlorohydrin rubber (CHR), acrylate rubber (ACM), poly (allylamine), xanthan gum, guar gum, chitosan, polyvinyl acetate, gelatin, casein, cellulose, and poly(carboxylic acid).

3. The electrode of claim 2 wherein the cellulose is selected from the group consisting of natural cellulose, physically modified cellulose, chemically modified cellulose, natural polysaccharides, chemically modified polysaccharides, physically modified polysaccharides, hydroxymethyl cellulose, and methyl ethyl hydroxy cellulose.

4. The electrode of claim 2 wherein the poly(carboxylic acid) is selected from the group consisting of polylactic acid (PLA), polyacrylic acid, polysuccinic acid, poly maleic acid and anhydride, poly furoic (pyromucic acid), poly fumaric acid, poly sorbic acid, poly linoleic acid, poly linolenic acid, poly glutamic acid, poly methacrylic acid, poly licanic acid, poly glycolic acid, poly aspartic acid, poly amic acid, poly formic acid, poly acetic acid, poly propionic acid, poly butyric acid, poly sebacic acid, and copolymers thereof.

5. The electrode of claim 1 further comprising:
   a carbon additive selected from the group consisting of carbon black, carbon fiber, carbon nanotubes, graphite, and graphene.

6. The electrode of claim 5 wherein the TMHCM active material is greater than 50%, by weight, as compared to a combined weight of the TMHCM active material, carbon additive, and binder.

7. The electrode of claim 1 wherein the TMHCM active material is expressed by the formula $A_N M1_P M2_Q (CN)_R \cdot FH_2O$;
   where "A" is selected from a first group of metals including alkali and alkaline earth metals;
   where M1 and M2 are independently selected from a second group of metals;
   where N is in a range of 0 to 2;
   where P is less than or equal to 2;
   where F is in a range of 0 to 20;
   where Q is less than or equal to 2; and,
   where R is less than or equal to 6.

8. The electrode of claim 7 wherein the first group of metals includes lithium (Li), sodium (Na), potassium (K), rubidium (Rb), cesium (Cs), calcium (Ca), strontium (Sr), barium (Ba), silver (Ag), aluminum (Al), magnesium (Mg), and combinations thereof.

9. The electrode of claim 7 wherein M1 and M2 are materials each independently selected from the group consisting of titanium (Ti), vanadium (V), chromium (Cr), manganese (Mn), iron (Fe), cobalt (Co), nickel (Ni), copper (Cu), zinc (Zn), niobium (Nb), ruthenium (Ru), tin (Sn), indium (In), cadmium (Cd), Ca, Mg, strontium (Sr), and barium (Ba).

10. A method of fabricating a transition metal hexacyanometallate (TMHCM) electrode with a water-soluble binder, the method comprising:
    forming an electrode mix slurry comprising TMHCF and a binder comprised exclusively of a water-soluble material;
    applying the electrode mix slurry to a current collector; and,
    dehydrating the electrode mix to form an electrode.

11. The method of claim 10 wherein forming the electrode mix slurry includes forming an electrode mix slurry additionally comprising a carbon additive selected from the group consisting of carbon black, carbon fiber, carbon nanotubes, graphite, and graphene.

12. The method of claim 11 wherein forming the electrode includes forming the electrode with TMHCM greater than 50%, by weight, as compared to a combined weight of the TMHCM, carbon additive, and binder.

13. The method of claim 10 wherein forming the electrode mix slurry includes the water-soluble material being selected from the group consisting of poly(acrylonitrile-co-acrylamide) polymer, carboxymethylcellulose (CMC), poly vinyl alcohol, polyvinylpyrrolidone, poly acrylic acid, polymethacrylic acid, polyethylene oxide, polyacrylamide, poly-N-isopropylacrylamide, poly-N,N-dimethylacrylamide, polyethyleneimine, polyoxyethylene, polyvinylsulfonic acid, poly(2-methoxyethoxyethoxyethylene), styrene butadiene rubber (SBR), butadiene-acrylonitrile rubber (NBR), hydrogenated NBR (HNBR), epichlorohydrin rubber (CHR), acrylate rubber (ACM), poly(allylamine), xanthan gum, guar gum, chitosan, polyvinyl acetate, gelatin, casein, cellulose, and poly(carboxylic acid).

14. The method of claim 13 wherein the cellulose is selected from the group consisting of natural cellulose, physically modified cellulose, chemically modified cellulose, natural polysaccharides, chemically modified polysaccharides, physically modified polysaccharides, hydroxymethyl cellulose, and methyl ethyl hydroxy cellulose.

15. The method of claim 13 wherein the poly(carboxylic acid) is selected from the group consisting of polylactic acid (PLA), polyacrylic acid, polysuccinic acid, poly maleic acid and anhydride, poly furoic (pyromucic acid), poly fumaric acid, poly sorbic acid, poly linoleic acid, poly linolenic acid, poly glutamic acid, poly methacrylic acid, poly licanic acid, poly glycolic acid, poly aspartic acid, poly amic acid, poly formic acid, poly acetic acid, poly propionic acid, poly butyric acid, poly sebacic acid, and copolymers thereof.

16. A battery having a transition metal hexacyanometallate (TMHCM) cathode with water-soluble binder, the battery comprising:
    a cathode comprising TMHCM and a binder formed exclusively from water-soluble materials;
    an anode; and,
    a non-aqueous electrolyte.

17. The battery of claim 16 wherein the water-soluble binder is selected from the group consisting of poly(acrylonitrile-co-acrylamide)polymer, carboxymethylcellulose (CMC), poly vinyl alcohol, polyvinylpyrrolidone, poly acrylic acid, polymethacrylic acid, polyethylene oxide, polyacrylamide, poly-N-isopropylacrylamide, poly-N,N-dimethylacrylamide, polyethyleneimine, polyoxyethylene, polyvinylsulfonic acid, poly(2-methoxyethoxyethoxyethylene), styrene butadiene rubber (SBR), butadiene-acrylonitrile rubber (NBR), hydrogenated NBR (HNBR), epichlorohydrin rubber (CHR), acrylate rubber (ACM), poly(allylamine), xanthan gum, guar gum, chitosan, polyvinyl acetate, gelatin, casein, cellulose, and poly(carboxylic acid).

18. The battery of claim 17 wherein the cellulose is selected from the group consisting of natural cellulose, physically modified cellulose, chemically modified cellulose, natural polysaccharides, chemically modified polysaccharides, physically modified polysaccharides, hydroxymethyl cellulose, and methyl ethyl hydroxy cellulose.

19. The battery of claim 17 wherein the poly(carboxylic acid) is selected from the group consisting of polylactic acid (PLA), polyacrylic acid, polysuccinic acid, poly maleic acid and anhydride, poly furoic (pyromucic acid), poly fumaric acid, poly sorbic acid, poly linoleic acid, poly linolenic acid, poly glutamic acid, poly methacrylic acid, poly licanic acid, poly glycolic acid, poly aspartic acid, poly amic acid, poly formic acid, poly acetic acid, poly propionic acid, poly butyric acid, poly sebacic acid, and copolymers thereof.

20. The battery of claim 16 wherein the cathode further comprises a carbon additive selected from the group consisting of carbon black, carbon fiber, carbon nanotubes, graphite, and graphene.

21. The battery of claim 16 wherein the TMHCM is expressed by the formula $A_N M1_P M2_Q(CN)_R \cdot FH_2O$;
- where "A" is selected from a first group of metals including alkali and alkaline earth metals;
- where M1 and M2 are independently selected from a second group of transition metals;
- where N is in a range of 0 to 2;
- where P is less than or equal to 2;
- where F is in a range of 0 to 20;
- where Q is less than or equal to 2; and,
- where R is less than or equal to 6.

22. The battery of claim 16 wherein the anode is made from a material selected from the group consisting of carbonaceous materials, alkali metals, alkaline earth metals, alloys including tin, alloys including lead, alloys including silicon, alloys including phosphorous, alloys including germanium, titanates including alkali metals, titanates including alkaline earth metals, and combinations thereof.

* * * * *

UNITED STATES PATENT AND TRADEMARK OFFICE
CERTIFICATE OF CORRECTION

PATENT NO. : 9,666,866 B2
APPLICATION NO. : 14/340141
DATED : May 30, 2017
INVENTOR(S) : Long Wang, Yuhao Lu and Sean Vail It is certified that error appears in the above-identified patent and that said Letters Patent is hereby corrected as shown below:

In the Specification

In Column 6, Line 33, and in Column 7, Line 5, the formula should be written as follows:
$A_N M1_P M2_Q (CN)_R \cdot FH_2O$ Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*